United States Patent [19]

Wilson, Jr.

[11] Patent Number: 4,623,756

[45] Date of Patent: Nov. 18, 1986

[54] FENCE POST INSULATING CAP

[75] Inventor: Robert M. Wilson, Jr., Battle Creek, Mich.

[73] Assignee: Dare Products, Inc., Battle Creek, Mich.

[21] Appl. No.: 766,716

[22] Filed: Aug. 19, 1985

[51] Int. Cl.[4] ........................ H01B 17/14; A01K 3/00

[52] U.S. Cl. ................................ 174/158 F; 52/301; 174/175; 256/10

[58] Field of Search ............ 174/45 R, 158 F, 161 F, 174/163 F, 165, 174, 175, 194; 52/244, 300, 301, 649; 74/558.5; 248/188.9; 256/10, 11, 48; 403/308; D13/17, 18; D25/77, 78

[56] References Cited

U.S. PATENT DOCUMENTS

| | | | |
|---|---|---|---|
| D. 27,756 | 10/1897 | Graham | D13/18 |
| D. 35,462 | 12/1901 | King | D13/18 |
| 2,396,512 | 3/1946 | Johnson | 174/45 R |
| 2,721,891 | 10/1955 | Kersten | 174/158 F |
| 2,756,969 | 7/1956 | Meinen | 256/10 |
| 2,801,277 | 7/1957 | Numsen | 174/158 F |
| 3,562,407 | 2/1971 | Beebe | 174/175 |
| 3,654,383 | 4/1972 | Wilson | 174/163 F |
| 4,077,611 | 3/1978 | Wilson | 256/10 |
| 4,520,231 | 5/1985 | Hubbell | 174/158 F |

FOREIGN PATENT DOCUMENTS

| | | | |
|---|---|---|---|
| 1099498 | 3/1955 | France | 174/158 F |
| 1194113 | 5/1959 | France | 174/163 F |
| 852801 | 11/1960 | United Kingdom | 174/163 F |

OTHER PUBLICATIONS

1 Page Circular entitled "Protect Your Horses with Hot Caps" Hot Cap P.O. Box 846, Parker, Colo. 80134.

*Primary Examiner*—Laramie E. Askin
*Attorney, Agent, or Firm*—Irvin L. Groh

[57] ABSTRACT

An electric fence insulator cap for mounting on various weight and flange configuration T-posts in any of four 90° spaced positions. The electric fence wire is held in a pair of spaced slotted lugs for simple installation. The cap top is generally sloped to deflect rain with a central flat surface for impacting installation on the fence post.

7 Claims, 4 Drawing Figures

FENCE POST INSULATING CAP

This invention relates to electric fence insulators, and, more particularly, to an insulator cap for installation on top of studded T-posts of various sizes and configurations.

There is a wide variety of insulators available for mounting on fence posts of various configurations to constitute an electric fence installation. For example, Johnson, U.S. Pat. No. 2,396,512 illustrates a clamping type insulator for mounting on an angle iron post; Meinen, U.S. Pat. No. 2,756,969 and Beebe, U.S. Pat. No. 3,562,407 show collars for mounting on round posts; Numsen, U.S. Pat. No. 2,801,277 and Wilson, U.S. Pat. No. 4,077,611 teach clips for installation on T-posts; and Wilson, U.S. Pat. No. 3,654,383 shows a clip for installation on angle iron or T-post configurations.

There are a fewer number of insulators for mounting on the top of fence posts, although this type of insulator is desirable, for example, as a means of protection for the animals being constrained and personnel from injury due to contact with the fence post top when being shocked or by some accidental occurrence. Kersten, U.S. Pat. No. 2,721,891 shows a cap type insulator for installation on a round rod type post; and at least one attempt has been made to construct a cap for installation on a T-post. The T-post construction has been limited to a specific size and configuration T-post for grasping the T-post stud and flange ends and has been limited to the choice of two 180° opposing orientations.

It is an object of this invention to provide an insulator or installation on a T-post in any one of four 90° separated orientations.

It is another object of this invention to provide a T-post cap type insulator for installation on posts of various sizes, namely the standard 1.0#/FT (1 pound per lineal foot), 1.25#/FT and 1.33#/FT.

It is still another object of this invention to provide a T-post cap type insulator for installation on posts of different configurations, loosely defined as narrow and wide flange T-posts.

It is a primary objective of this invention to provide such a T-post cap type insulator which will engage a T-post of the different foregoing sizes and configurations with wedging retention.

The foregoing objects and other objectives have been accomplished in a cap with an aesthetically pleasing appearance which can be installed with the simple expediency of hammer impact. Such an installation provides wedging retention of the cap by the coaction of pairs of ribs within the cap with the T-post stud, flanges and web.

The cap is molded from a weather-proof, electrically insulating, high impact plastic such as polyethylene. The cap includes a tubular body having a sloped top closing one end of the body. The sloped top is constructed with a skirt portion overlying the outside of the tubular body. Preferably, the top is sloped or rounded in overall configuration with a central flat portio designed to receive hammer blows as the insulating cap is installed on the T-post. In the preferred form the sloped surface in conjunction with the flat central portion has the shape of a truncated cone of a wide angle which joins a deeper sloped surface extending to the lower end of the skirt surface. This sloped o rounded configuration provides means for shedding water.

Four pairs of adjacent axially extending parallel ribs are molded with the inside diameter of the tubular body projecting inwardly at four equally spaced points separated 90° around the inner circumference of the body. Wire retention means is provided extending outwardly from the tubular body aligned in parallel relationship with a pair of the ribs. The wire retention means preferably takes the form of a pair of axially extending outwardly projecting parallel lugs aligned parallel with the pair of internal ribs. One of the lugs has an upwardly opening slot and the other of the lugs has a downwardly opening slot to accommodate a wire extending perpendicularly through the slots.

The wire retention lugs are spaced apart a distance to permit a horizontally strung wire to pass between the lugs as the cap is held with its axis in a horizontal position, thus allowing the wire to slip into the slots as the cap is rotated to a vertical position for attachment to a T-post. The axial extents of the slots overlap each other to accommodate the wire passing through both slots.

In installing the cap on the T-post, it is first oriented in a selected one of four 90° spaced positions to receive the wire. The cap is then driven onto the studded T-post in this selected position by impacting the top with a hammer. As the cap is driven onto the T-post, one of the pairs of ribs grips a stud of the studded T-post between its ribs while the closer of the ribs of the two pairs of ribs at 90° to the stud-gripping ribs engage the flanges of the T-post to provide wedging retention of the cap on the T-post. This engagement involving three pairs of ribs is effective to hold the wide flange configuration in the various standard weight T-posts. In the narrow flange configuration, the T-post web engages the pair of ribs opposing the stud-engaging ribs to receive the cap in wedging retention on the post.

With the use of a high impact plastic which is also resilient, such as polyethylene, the cap will fit any of the wide variations and actual flange and web shapes which exist between manufacturers and even bent and distorted T-posts will be accommodated with a tight fit because of the resilience and the fact that the post can actually cut into the cap ribs, further assuring such tight retention. Because the ribs extend the entire longitudinal length of the tubular body portion of the cap, and because the material is resilient, the cap can be reused or hammered off and reoriented to change the wire engaging direction and reapplied by hammer blows.

The objects of this invention are accomplished by the embodiment disclosed in the following description and illustrated in the drawings in which.

Figure 1:
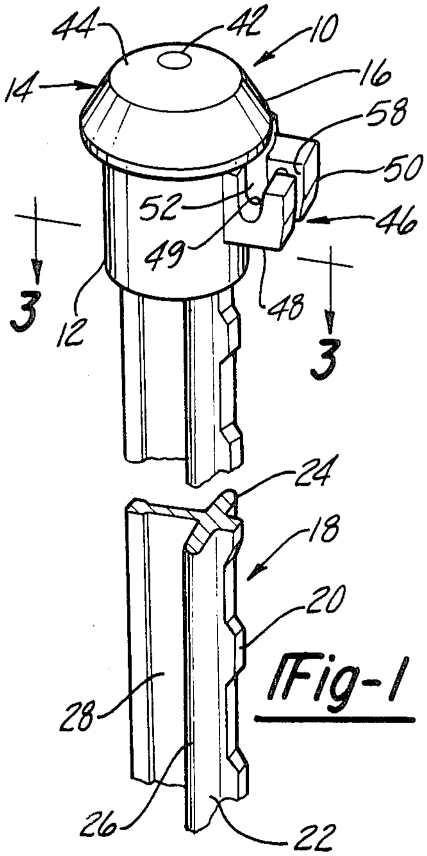
FIG. 1 is a perspective view of the insulating cap of the present invention installed on a T-post with the wire engaging lugs facing outward from the flange faces in the direction of the studs.
Figure 3:
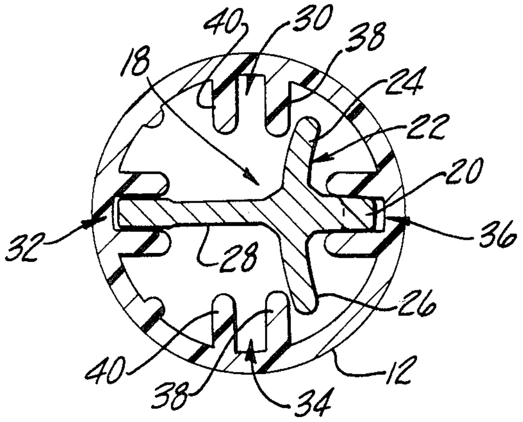
Figure 4:
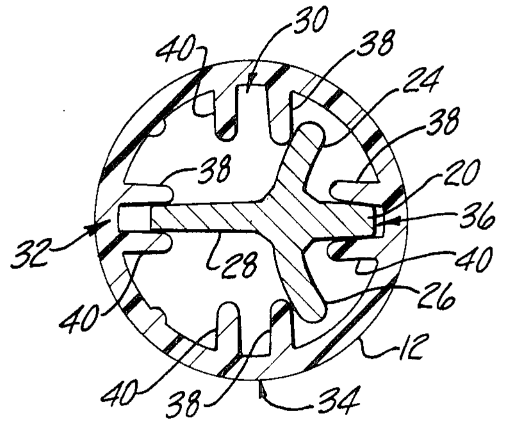

FIG. 3 is a cross-section through the cap of this invention and the T-post taken along line 3—3 of FIG. 1 showing the engagement of a narrow flange T-post with the stud within one pair of ribs and the post web in engagement with the opposed pair of ribs; and FIG. 4 is a view similar to FIG. 3 showing the engagement of a wide flange T-post with the stud being gripped by one pair of ribs and the two flanges being engaged by the closer of the ribs in the two pairs of ribs at 90° to the stud-engaging ribs accommodating the cap in wedging retention on the T-post.

The electric fence insulator cap 10 of this invention is molded as an integral one-piece structure from a weather-proof, electrically insulating, resilient, high impact plastic such as polyethylene. Cap 10 has a tubular body portion 12 which is closed at one end by a sloped or rounded top 14 with a skirt portion 16 overhanging or overlying the tubular body portion. FIG. 1 shows cap 10 installed on T-post 18 with the top of the T-post totally extending within the tubular body 12. T-post 18 has studs or protuberances 20 extending from base 22 formed by flanges 24 and 26. Web portion 28 extends in line with studs 20 constituting the up-right leg of the T, and flange members 24 and 26 taken together constitute the cross-member of the T. Through the range of standard weights of 1.0#/FT, 1.25#/FT and 1.33#/FT, the flange shape and curvature may vary, but can be generally classified as a narrow, or wide flange T-post as shown respectively in FIGS. 3 and 4.

Figure 2:
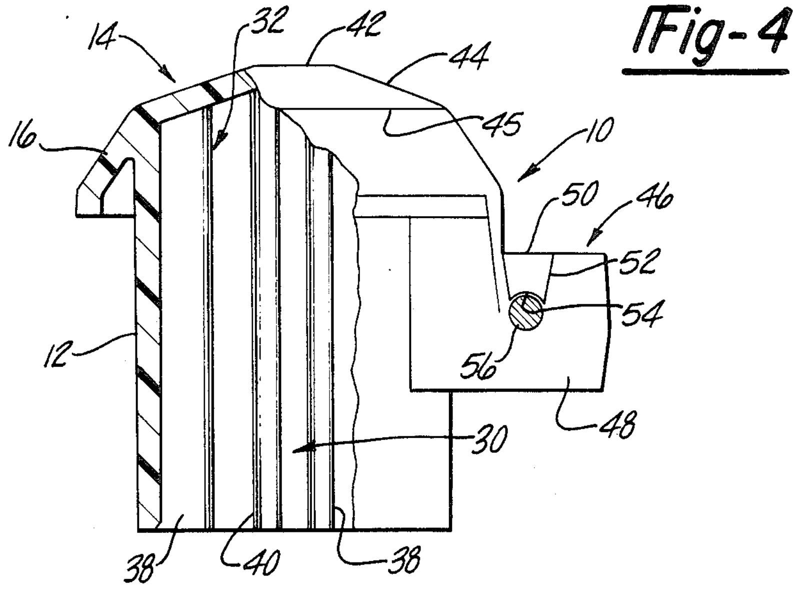
FIG. 2 is a side elevation partially in section showing the insulating cap of this invention with the electric wire retained within the lug slots.

Four pairs, 30, 32, 34 and 36 of adjacent parallel ribs are molded extending inwardly from the inside diameter of tubular body 12 and extending the entire longitudinal length of the body as shown in FIG. 2. These pairs of ribs are spaced equally around the circumference of the tubular body with 90° separations. As shown in FIGS. 3 and 4, one of the pairs 36 of ribs 38 and 40 grips the stud 20 of the T-post and in the narrow flange configuration as shown in FIG. 3, the opposing pair 32 of ribs engages the web 28 of the T-post to form a wedging fit as the cap is driven onto the T-post. With the wide flange configuration, the closer ribs 38 of the two pairs 30 and 34 of ribs at 90° to the stud-gripping pair of ribs 36 engage the flanges 24, 26 to accept the cap 10 in wedging retention on the T-post 18.

In the preferred embodiment, the sloped top 14 is formed with a flat central portion 42 designed to receive hammer blows as the cap is installed on the T-post. As shown in FIG. 2, the cap slopes downwardly from flat portion 42 with a wide angle conical surface 44 to hip line 45 from which the skirt portion 16 depends at a steeper angle. The skirt portion 16 overhangs the tubular wall 12 to provide an aesthetically pleasing appearance and to shed rain water easily. Wire retention means 46 in the form of a pair of spaced lugs 48 and 50 project outwardly from tubular body 12 in parallel alignment with an adjacent pair of ribs and necessarily in parallel alignment with the opposing pair of ribs. For example, lugs 48 and 50 may be located adjacent to the pairs of ribs 36 in line with both pairs of ribs 36 and 32, or they could be located adjacent to the pair of ribs 34, parallel to the pairs of ribs 34 and 30. One of the lugs 48 has an upwardly opening slot 52 while the other lug 50 has a downwardly opening slot 54 to accommodate a wire 56 extending perpendicularly through both slots.

Lugs 48 and 50 are spaced apart a distance 58 to permit the horizontally strung wire 56 to pass between them as the cap is held with its axis in a horizontal position. This allows the wire 56 to slip into both slots 52 and 54 as the cap is rotated to a vertical position for attachment to the T-post. The axial extents of the slots overlap each other to accommodate the wire passing through both slots. As can best be seen in FIG. 1, lugs 48 and 50 can extend outwardly from a boss 49 extending outwardly from tubular body 12 and downwardly from skirt portion 16 of sloped top 14.

In installing the cap 10 on T-post 18, it is first oriented with wire receiving lugs 48 and 50 in one of four 90° spaced positions to receive the wire 56. The cap 10 is then driven onto the studded T-post in this selected position by impacting the top of the flat portion 42 with a hammer. As the cap is driven onto the T-post, one of the pairs of ribs grips a stud 20. This stud-gripping pair of ribs is shown as pair 36 in FIGS. 3 and 4 but could be any one of the pairs 30, 32, 34 and 36. As has been explained, the wedging action creating the tight fit of the cap on the T-post occurs in the wide flange configuration shown in FIG. 4 by the co-action of the closer ribs 38 of the pairs of ribs 30 and 34 with the flanges 24 and 26 and the pair of ribs 36 with the stud 20. In the narrow flange configuration, as shown in FIG. 3, this co-action is with the pair of ribs 32 gripping web 28 and the pair of ribs 36 gripping the stud 20.

The embodiments of the invention in which an exclusive property or privilege is claimed are defined as follows:

1. An electric fence insulator cap for installation on the top of a studded T-post, said cap being molded from a weather-proof electrically insulating, high impact plastic, comprising: a tubular body; a sloped top closing one end of said tubular body; four pairs of adjacent axially co-extending parallel ribs projecting inwardly from said tubular body and spaced to grip a T-post stud therebetween, said pairs of ribs being equally spaced at 90° around the inner circumferences of said body; wire retention means extending outwardly from said tubular body aligned with a pair of said ribs, whereby said wire retention means can be oriented in a selected one of four 90° spaced positions to receive a wire and the cap can be driven onto a studded T-post in such selected position by impacting said top, one of said pairs of ribs then gripping a stud of said studded T-post between ribs while the closer of the ribs in the two pairs of ribs at 90° to the stud-gripping ribs will then engage the flanges of said T-post for coaction with said stud-gripping pair of ribs or the pair of ribs opposing the stud-gripping ribs will receive the web of said T-post for coaction with said stud-gripping pair of ribs to accept said cap in wedging retention on said T-post.

2. The electric fence insulator cap according to claim 1 wherein said sloped top has a skirt portion overlying the outside of said tubular body.

3. The electric fence insulator cap according to claim 2 wherein said top has a central flat portion which serves as an impacting surface and a sloping portion extending from said flat portion to the end of said skirt portion.

4. The electric fence insulator cap according to claim 1 wherein said wire retention means comprises a pair of outwardly projecting parallel lugs aligned parallel with a pair of ribs, one of said lugs having an upwardly opening slot and the other of said lugs having a downwardly opening slot to accommodate a wire to extend perpendicularly through said slots.

5. The electric fence insulator cap according to claim 4 wherein said sloped top has a skirt portion overlying the outside of said tubular body and further comprising a boss extending outwardly from said tubular body and downwardly from said skirt portion from which said pair of outwardly projecting lugs extend.

6. An electric fence insulator cap for installation on the top of a studded T-post, said cap being molded from a weather-proof electrically insulating, high impact plastic, comprising: a tubular body; a sloped top closing one end of said tubular body; four pairs of adjacent axially co-extending parallel ribs projecting inwardly from said tubular body, and spaced to grip a T-post stud therebetween, said pairs of ribs being equally spaced at 90° around the inner circumference of said body; a pair of axially extending outwardly projecting parallel lugs aligned parallel with two opposed pairs of said ribs, one of said lugs having an upwardly opening slot and the other of said lugs having a downwardly opening slot, the axial extents of said slots overlapping each other to accommodate a wire to extend perpendicularly through said slots, whereby said slots can be oriented in a selected one of four 90° spaced positions to receive a wire and the cap can be driven onto a studded T-post in such selected position by impacting said top, one of said pair of ribs then gripping a stud of said studded T-post between ribs while the closer of the ribs in the two pairs of ribs at 90° to the stud-gripping ribs will then engage the flanges of said T-post for coaction with said stud-gripping pair of ribs or the pair of ribs opposing the stud-gripping ribs will receive the web of said T-post for coaction with said stud-gripping pair of ribs to accept said cap in wedging retention on said T-post.

7. The electric fence insulator cap according to claim 6 wherein said lugs are spaced apart a sufficient distance to permit a horizontally strung wire to pass between the lugs as the cap is held with its axis in a horizontal position and to allow the wire to slip into said slots as the cap is rotated to a vertical position for attachment to a T-post.

* * * * *